Patented Feb. 25, 1936

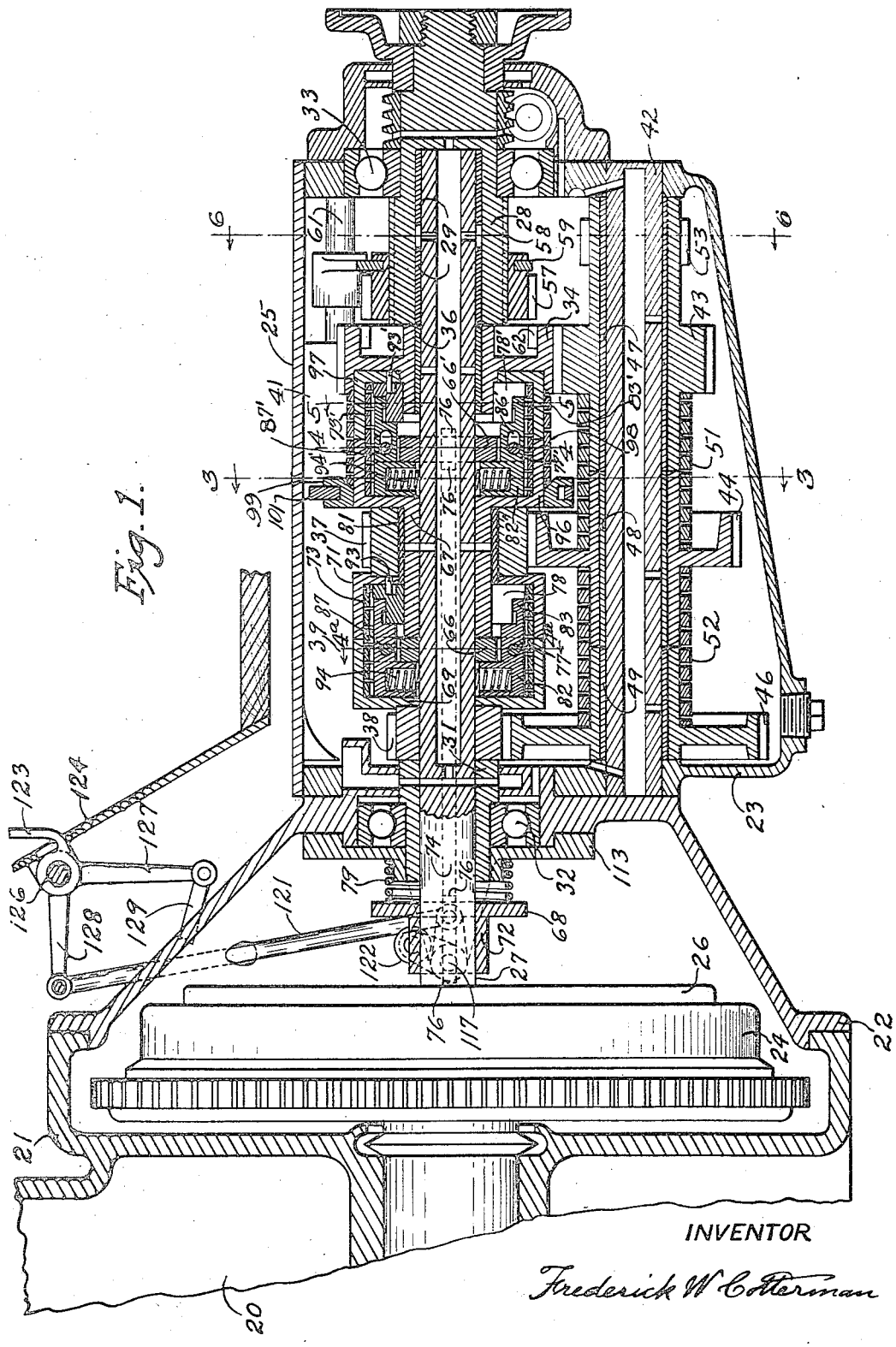

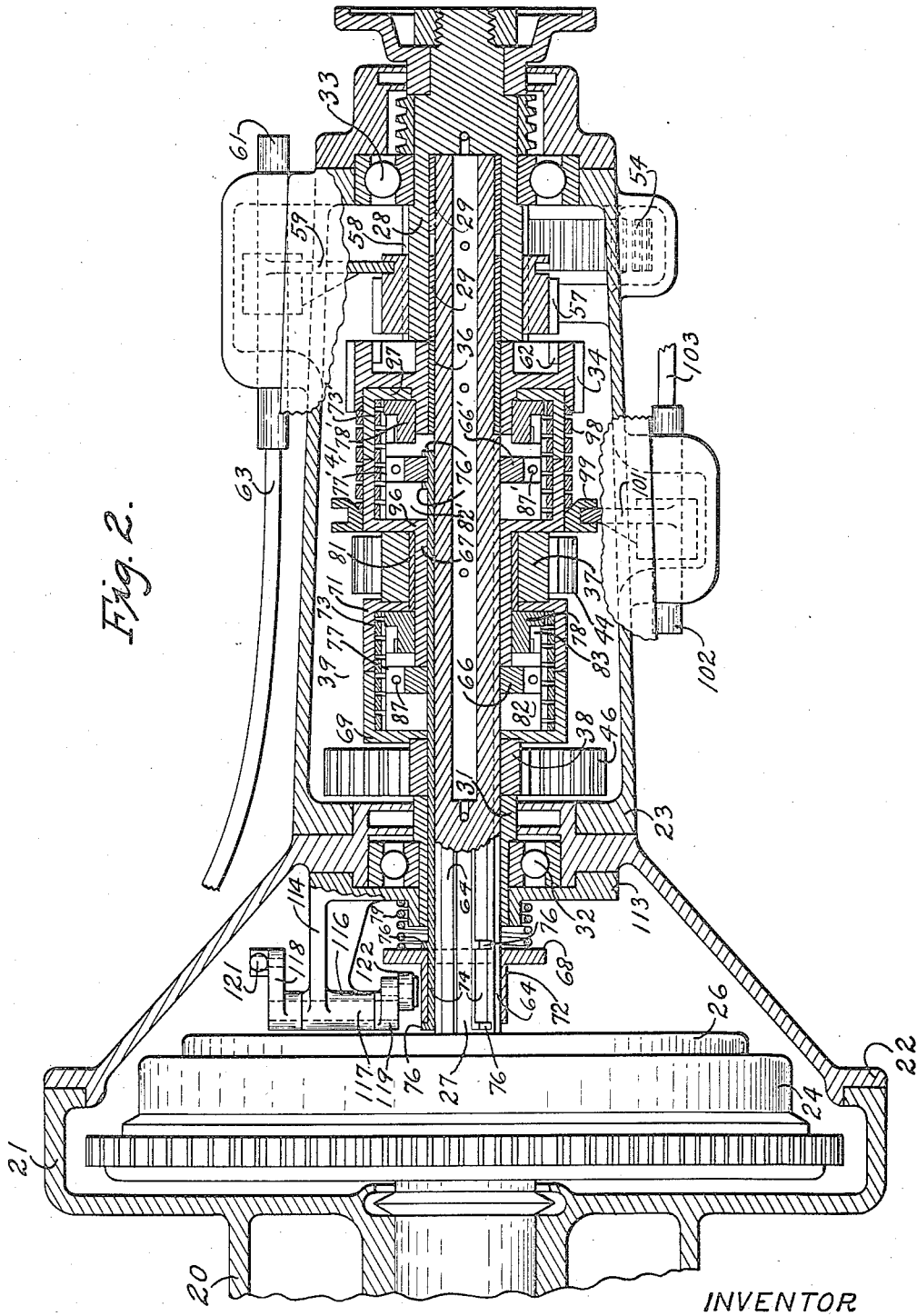

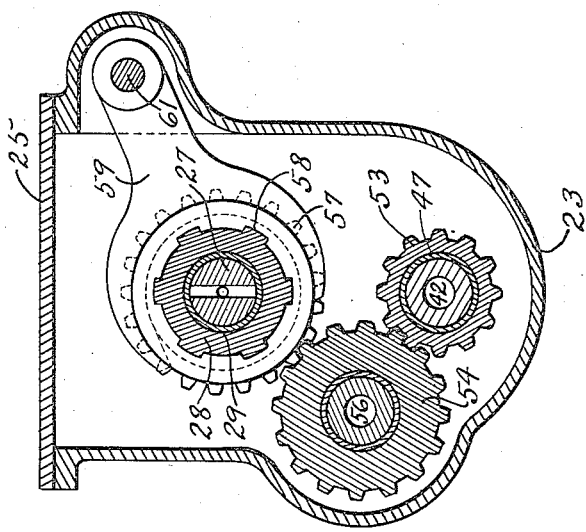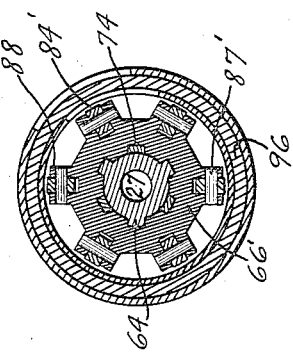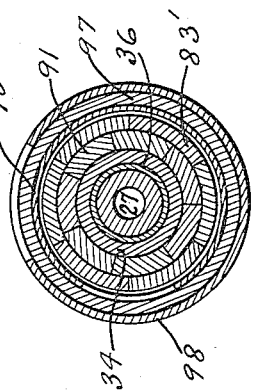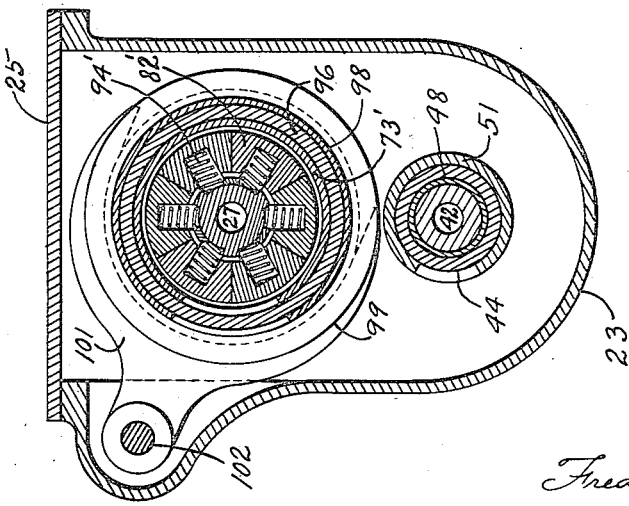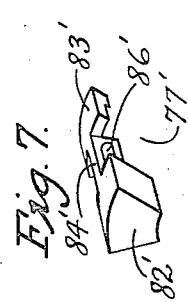

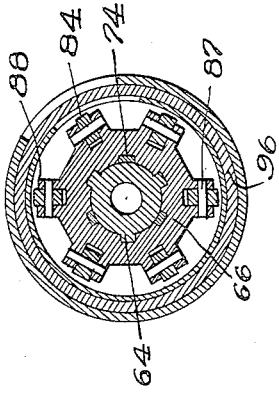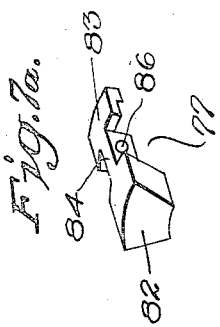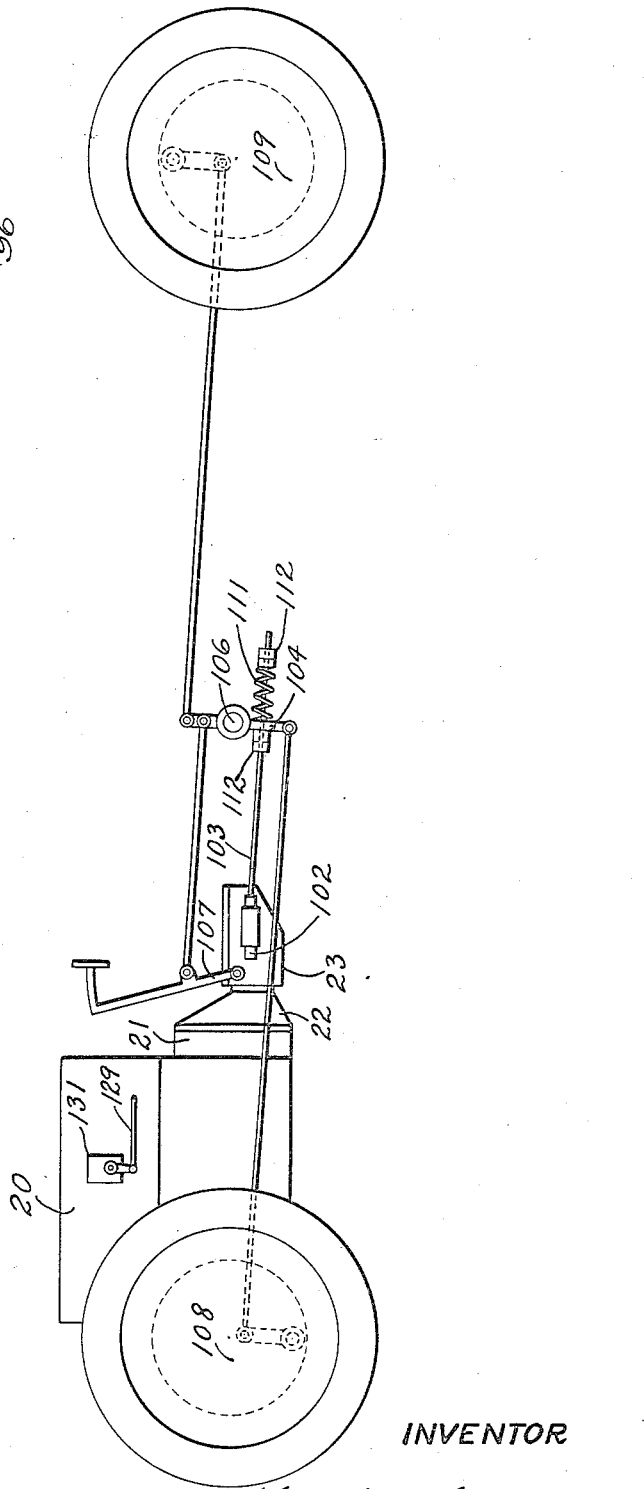

2,032,050

UNITED STATES PATENT OFFICE 2,032,050

AUTOMOTIVE TRANSMISSION AND BRAKING MECHANISM

Frederick W. Cotterman, Dayton, Ohio, assignor of one-half to Bessie D. Apple, Dayton, Ohio Application July 28, 1933, Serial No. 682,661

10 Claims. (Cl. 74—472)

This invention relates to mechanism for transmitting power to propel an automotive vehicle as well as for reducing its speed when it is under motion, the herein described embodiment being particularly applicable to a vehicle driven by the conventional variable speed automotive engine.

The reduction gear mechanism which transmits the power from such an engine to the wheels of the vehicle is preferably such as will at any time connect the engine and wheels with a gear ratio which will effect a true balance between the resistance then offered by the wheels and the greatest speed torque-procurable with the then existing throttle opening.

It is one of the objects of this invention to provide a transmission mechanism having free-wheeling characteristics and gearing giving three forward speeds viz., a low speed, a second speed and a high speed together with such mechanism as will, after each free-wheeling movement, select for further driving relation, that gear ratio which will effect most nearly, such a balance between the aforesaid forces.

It is another object of this invention to provide mechanism operative to automatically select a lower gear ratio at any time that such lower gear ratio will more nearly provide a true balance between the then existing wheel resistance and the maximum speed-torque procurable with the then existing throttle opening.

Another object of this invention is to provide a transmission structure having free-wheeling characteristics whereby the vehicle may move faster than the then existing engine speed would move it, but having mechanism operative to connect the driving and driven elements of the free-wheeling unit for driving the engine by means of the vehicle momentum, such mechanism being operative only when application of braking effort is made to the vehicle wheels.

Further objects and advantages will appear from the following description, reference being had to the drawings, wherein, Fig. 1 is a vertical axial section through the transmission mechanism.

Fig. 2 is a horizontal axial section through the transmission mechanism, except for several fragmentary portions which appear in plan.

Fig. 3 is a transverse section taken at 3—3 of Fig. 1 through the clutch mechanism.

Fig. 4 is a transverse section taken at 4—4 of Fig. 1 through the clutch mechanism.

Fig. 4a is a transverse section taken at 4a—4a of Fig. 1 through the clutch mechanism.

Fig. 5 is a transverse section taken at 5—5 of Fig. 1 through the clutch mechanism.

Fig. 6 is a transverse section taken at 6—6 of Fig. 1 through the reversing mechanism.

Fig. 7 is a detail perspective view of one of the governor weights.

Fig. 7a is a detail perspective view of another of the governor weights.

Fig. 8 is a detail perspective view of a supplemetary governor weight.

Fig. 9 is a schematic view showing the association of a part of the structure with the wheel braking mechanism.

Similar numerals refer to similar parts throughout the several views.

A conventional automotive engine 20 has a flywheel housing 21. A cover 22 encloses the housing 21 and supports the transmission housing 23. A cover 25 closes the top of the housing 23.

The connectible clutch member is secured to the high speed shaft 27 to rotate in unison therewith. The high speed shaft 27 extends throughout the length of the transmission housing and has rotative bearing at its rear end in the low speed shaft 28. Bearing bushings 29, press-fitted into the low speed shaft 28, are runningly fitted to the outer diameter of shaft 27 at its end.

The forward end of the shaft 27 is surrounded by a bushing 31, the shaft and bushing being joined to rotate in unison. A front ball bearing 32 and a rear ball bearing 33 are press-fitted to the bushing 31 and the low speed shaft 28 respectively. The outer diameter of ball bearing 32 has a seat in the fly wheel cover 22 while the bearing 33 is seated in the transmission housing 23.

The low speed gear 34 is mounted to rotate freely on the shaft 27. Bearing bushing 36 is press-fitted to the hub of the gear and runningly-fitted to the outside of the shaft. The remaining parts, other than the low speed shaft 28 and the low speed gear 34, which are within the transmission housing and which immediately surround the shaft 27 are splinedly connected thereto.

Coaxial with and spaced from the low speed gear 34 are the second and high speed gears 37 and 38 respectively. Coaxial with and between these spaced apart gears are two clutches, one of which, broadly designated by the numeral 39 may be called the second speed clutch because, when it engages, second gear is in effect, and the other, broadly designated by the numeral 41 may be called the high speed clutch because, when it engages, high gear is in effect. When neither of the clutches 39 or 41 are engaged, then low gear is in effect.

A countershaft 42 is secured against rotation in the ends of the housing 23. Gears 43, 44 and 46, spaced thereon, mesh with gears 34, 37 and 38 respectively. The gears 43, 44 and 46 have press-fitted bearing bushings 47, 48 and 49 respectively, which are runningly fitted to the countershaft 42. Coil spring clutches 51 and 52 connect the several countershaft gears whereby the gear 44 may run faster but not slower than the gear 46 and the gear 43 may run faster but not slower than the gear 44.

A reverse pinion 53 is cut integral with the countershaft gear 43 and an idler gear 54 freely rotates on shaft 56 (see Fig. 6) and meshes with this reverse pinion. A gear 57 is axially slidable on the splines 58 of the low speed shaft 28 by the fork 59 operated by the rod 61. Internal teeth 62 in the face of the gear 34 correspond to the external teeth of the gear 57. When the fork 59 is shifted forward until the gear 57 enters the teeth 62, the mechanism is set for forward movement of the vehicle and when it is shifted rearward until the gear 57 meshes with the idler gear 54, it is set for backward movement. A wire control 63 (see Fig. 2) may be used to connect the rod 61 to a push button on the instrument panel, (not shown) or the rod 61 may be otherwise operated.

The shaft 27 has three integral splines 64 equally spaced on its external surface (see Figs. 2 and 4) extending its entire length except at the rear end where the bearing bushings 36 and 29 surround it. The parts 66', 67, 66, 69, 38, 31 and 72 each have six equally spaced internal keyways, three of the keyways of each part fitting slidably over the splines 64. Only one of the splined parts, viz., part 66', has space for axial movement on the shaft 27.

The other three keyways of the parts 66', 67, 66, 69, 38, 31 and 72 are occupied by the three splines 74, which lie loosely on the surface of the shaft 27 and are freely slidable axially in the keyways. The loose splines 74 each have four lugs 76, one on each side of the part 66' and one on each side of the part 72. It will be seen that any axial movement of the part 72 will impart axial movement to the part 66' through the loose splines 74. A coil spring 79 urges the part 72 axially toward the engine. The means for imparting axial movement to the part 72 and the result of so doing will be hereinafter set forth.

The second speed clutch 39 comprises the driving clutch cup 69, the driven clutch cup 71, the clutching spring 73 and the synchronizing governor which consists of six fast speed governor weights 77 (see detail Fig. 7a), seven slow speed governor weights 78 (see detail Fig. 8), and the governor spider 66.

The driving cup 69, being splinedly mounted on the shaft 27 always rotates at engine speed. Cup 69 is preferably also secured by rivets (not shown) to the end of the gear 38, which is also splinedly mounted on the shaft 27.

The driven cup 71 is securd to the ends of the gear 37 by rivets (not shown) and a bearing bushing 81 is press-fitted to the inside of the cup 71 and gear 37 and runningly fitted over the hub 67.

The clutching spring 73 is coiled from a piece of rectangular stock of greater breadth than depth, and ground on its outer diameter to fit the inside of the driving cup 69 quite closely, but to fit the inside of the driven cup 71 loosely, a clearance between the spring and driven cup of about .003 inch being preferred.

The fast speed governor weights 77 (see Fig. 7a) each have a heavy end 82 and a lighter end 83. The ends 82 and 83 are segmental and each comprise one-sixth of a complete ring. A fulcrum arm 84 connects the two ends. An opening 86 extends through the fulcrum arm for a fulcrum pin 87.

The governor spider 66, has six ears 88 (see Fig. 4a) each slotted radially to receive a fulcrum arm 84. The fulcrum pins 87 are press-fitted to the ears 88 and free fitted in the openings 86. Inasmuch as the governor spider 66 is splinedly mounted on the shaft the fast speed governor weights 77 always revolve at engine speed when the main clutch 26 is engaged.

The supplementary slow speed governor weights 78 (see Fig. 8) each comprise integrally a segmental portion 91 and a larger segmental portion 92, each portion comprising one-seventh of an entire ring. Seven equally spaced pins 93, press-fitted in the driven cup 71, extend into holes somewhat larger than the pins in the slow speed weights whereby the weights have slight radial movement but are never the less made to always revolve in unison with the cup 71 and the second speed gear 37.

The inside diameter of the spring 73 and the outside of the slow speed weights 78 are so dimensioned that when the weights rest closely on the hub 67 there will be a clearance of about .015 inch between the outside of the weights and the inside of the spring.

The heavy end 82 of each fast speed governor weight 77 has an opening which loosely contains a compression spring 94. The six compression springs 94 press the six heavy ends 82 of the weights 77 outwardly with a total pressure of about six pounds when the shaft 27 is not rotating. This pressure is transmitted through the fulcra 87 to the light ends 83 whereby the slow speed weights 78 are held against the hub 67 with a total pressure of six pounds when the shaft 27 is not rotating.

The high speed clutch 41 is constructed for the most part like the second speed clutch 39. There are, however, important minor differences. The driving clutch cup 96 is integral with the hub 67 and therefore revolves always in unison with the shaft 27. The driven clutch cup 97 is secured by rivets (not shown) to the web of gear 34. The clutching spring 73', weights 78', pins 93', spider 66', fulcra 87' and springs 94' are identical with those of the second speed clutch, while the fast speed weights 77' (see Fig. 7) differ only in having an elongated slot 86' instead of a round hole 86, Fig. 7a where the fulcrum pins 87' pass through the arms 84'.

On the outside of the cups 96 and 97 a coil clutching spring 98 fits loosely, the clearance between the spring and the cups being preferably about .005 inch. The spring 98 is beveled at the ends, and corresponding beveled faces are provided on the gear 34 and the grooved collar 99.

The grooved collar 99 is movable axially to compress the clutching spring 98 by means of the shifter fork 101 which is actuated by the rod 102. A smaller rod 103 (see Fig. 9) connects the rod 102 to an arm 104 on the brake shaft 106 whereby the clutching spring 98 is compressed endwise whenever the brake pedal 107 is depressed to apply the vehicle brakes 108 and 109. Preferably a slight movement of brake pedal 107 should compress the clutching spring 98 fully, then the spring 111 should yield so that a further movement may be had to set the brakes 108 and 109. Lock nuts 112 on the rod 103 permit adjustment of the spring 111 whereby the degree of end pressure applied to the clutching spring 98 may be regulated.

Extending from the front ball bearing cover 113 is a bracket 114 having a bearing hub 116 (see Fig. 2). A short shaft 117 is rotatable in the hub 116 and extends beyond it at the ends. An arm 118 is secured to one extending end and an arm 119 to the other. On the free end of arm 118 an upwardly extending rod 121 is pivotally supported. On the free end of the other arm 119 a roller 122 is rotatably supported.

An accelerator pedal 123 (see Fig. 1) is secured on the underside of the toeboard 124 to the shaft 126. An arm 127 is secured to the shaft 126 and extends downwardly. A second arm 128 is secured to the shaft and extends horizontally. The upper end of the rod 121 is pivotally secured to the free end of the arm 128. A rod 129 is pivotally secured to the free end of the arm 127 and extends forwardly for operating the carburetter 131.

It will be seen that when the accelerator pedal is depressed and more fuel is thereby offered to the engine the fulcra 87' will be shifted rearwardly in relation to the weight masses in the governor mechanism of the clutch 41. The result of so shifting the fulcra will be hereinafter set forth.

Throughout the drawings the transmission mechanism is shown in the condition which it assumes when the vehicle is at rest and the engine is at rest or running not faster than its idling speed of about 300 R. P. M. The mechanism may be operated as follows:

If the gear 57 has been manually shifted rearwardly into mesh with the idler gear 54 and the accelerator pedal 123 is then depressed until the engine rotates slightly faster than its idling speed of 300 R. P. M., the clutch 26 will engage by centrifugal force, drive the shaft 27 at engine speed, and transmit this movement through parts 38, 46, 52, 44, 51, 53, 54, 57 to the low speed shaft 28 which will then rotate oppositely of the shaft 27 and at about ¼ engine speed, whereupon the vehicle will move slowly backward.

If, however, the gear 57 has been manually shifted forwardly into the internal teeth 62 of gear 34, and the accelerator pedal is then depressed until the engine rotates slightly faster than its idling speed of 300 R. P. M. the clutch 26 will engage, drive the shaft 27 at engine speed and transmit this movement through parts 38, 46, 52, 44, 51, 43, 34, 57 to the low speed shaft 28 which will then rotate in the same direction as the shaft 27 and at about ⅓ engine speed, whereupon the vehicle will move slowly forward. This gear connection is termed low gear.

When the low gear connection is thus in effect the vehicle may be driven through the entire range of the engine speed which ordinarily will be from about two to eighteen M. P. H. But when driving in low gear at any speed over six and one-half M. P. H., a certain manipulation of the accelerator pedal will cause the clutching spring 73, which normally fits the cup 71 loosely, to be expanded into said cup whereby the cup 69 is connected directly to the cup 71 and a change from low gear to second gear is effected. The structural features which make this possible and the manner in which they are manipulated is as follows:

When low gear is in effect the slow speed weights 78 revolve only ¼ as fast as the fast speed weights 77. The centrifugal force of the fast speed weights 77 will be largely in excess of that of the slow speed weights 78 as long as the R. P. M. ratio of 1 to ¼ is maintained between them. It follows that as long as the vehicle is driven steadily in low gear the clutch 39 cannot become engaged.

Now the governor weight masses in clutch 39 are so distributed in relation to the fulcra 87 that the part to the rear of the fulcra 87 exceeds the part to the front thereof.

When, therefore, the fast speed weights 77 are for any reason synchronized in speed with the slow speed weights 78 the tendency is for the weight masses to rock on the fulcra 87 whereby the weight masses to the rear of the fulcra tend to move from the axis and those to the front of the fulcra are thereby urged toward it.

Now at low speeds, when the centrifugal force of the synchronized weight masses is very little, the springs 94 easily offset and overcome the amount that the force of the rearward mass exceeds the forward. But, if the speed of the synchronized masses is as much at 570 R. P. M., the springs 94 will be overcome to such an extent that the weights 78 will cease to bear on the hub 67 and will move outwardly and apply a pressure of four pounds to the inner surface of the clutching spring 73, which first expands this loose end of the spring to a larger diameter, then twists this end of the spring in a direction to uncoil it still more and cause it to fit the cup tightly thereby connecting the two cups together in driving relation.

The 570 R. P. M. stated is the speed at which the slow speed weights 78 revolve when the vehicle is moving six and one-half M. P. H. in low gear. It will be seen that, when driving in low gear, if the engine fuel is interrupted by release of the accelerator pedal, and the vehicle is left to free wheel until the engine speed drops sufficiently to synchronize the cup 69 and the cup 71, then, if the vehicle is moving over six and one-half M. P. H., a restoration of the fuel will effect second gear connection, and, if the vehicle is moving less than six and one-half M. P. H., a restoration of the fuel will merely re-establish the low gear connection.

When second gear connection is thus effected the power is transmitted from shaft 27 through parts 38, 69, 71, 37, 44, 51, 43, 34, 57 to the slow speed shaft 28, and the gear 46 idles without load, running slower than the gear 44 which the over-running clutch 52 permits.

When thus in second gear the vehicle may be driven up to the maximum speed which the engine is capable of driving it, which is ordinarily about thirty-five M. P. H. But anytime, after a second gear speed in excess of eleven and one-half M. P. H. is passed, the accelerator pedal may be released, while the vehicle free wheels, until the engine drops in speed sufficiently to synchronize the cups 96 and 97 of the high speed clutch 41 whereupon the governor mechanism within the clutch 41 will apply sufficient pressure to the inside of the clutching spring 73' to cause it to uncoil and connect the cups 96 and 97 directly, whereupon the power will be transmitted from the shaft 27 through the parts 67, 96, 97, 34, 57 to the low speed shaft 28, and all countershaft gears idle without load, the gear 43 running faster than the gear 44, and the gear 44 running faster than the gear 46. This is the high gear connection.

It will be seen that the manner of engaging the clutch 39 whereby a shift from low to second gear at six and one-half or more M. P. H., may be made, and the manner of engaging the clutch 41, whereby a shift from second to high gear at eleven and one-half or more M. P. H., may be made, is the same, namely, to interrupt the engine fuel momentarily than restore it.

The clutches 39 and 41, however, differ in this important particular. The clutch 39 has the fulcra 87 in fixed positions and these positions are such that at 575 R. P. M., of the entire mass (which is at 1000 engine R. P. M.), the outward force of the portion of the mass to the rear of the fulcra exceeds the outward force of the part to the front of the fulcra by four pounds.

Now if this unbalanced force is four pounds at 1000 engine R. P. M., then at 3000 engine R. P. M., it becomes thirty-six pounds. It will therefore be seen that after clutch 39 once engages to complete the second gear connection, it will disengage to bring back the low gear connection only when the load exceeds the power being applied to such an extent that the vehicle speed is pulled down to about six M. P. H.

On the other hand the clutch 41 has the fulcrum pins 87' shiftable axially in relation to the weight masses in proportion as more or less fuel is offered to the engine, and therefore the clutch 41 will automatically disengage and shift from high back to second whenever more fuel is offered to the engine than it can advantageously use except by changing from high back to second and allowing the engine speed to go up. To more fully explain the manner in which this takes place the following driving conditions may be considered.

Assume that while second gear was in effect the accelerator pedal was released and the vehicle is now free wheeling at eleven and one-half M. P. H. The weights 78' will now be revolving at 570 R. P. M., and the engine will begin to decelerate, from the 1000 R. P. M., which was required to bring the vehicle to this speed, to its 300 R. P. M. idling speed. But at any time after the engine has dropped under 570 R. P. M., the accelerator may be again depressed and the cups 96 and 97 connected for high gear as hereinbefore explained. Now when the engine is brought up to 570 R. P. M., without load, the roller 122 will just be touching the disc 68. The fulcra 87' are at this time in the unshifted position, in which position an outward pressure of four pounds is being exerted against the inside of the clutching spring 73'.

This pressure of four pounds will be more than enough to keep the clutch engaged when full driving effort is now applied. But if at any time this four pound pressure is reduced to one pound while full driving effort is being applied to the clutch, the clutching spring will let go and second gear will be reestablished.

Now if, at this stage, the operator desires to raise the vehicle speed to more than eleven and one-half M. P. H., but does not wish to go back to second gear to do so, he may depress the accelerator pedal gradually downward, thereby increase the fuel and shift the fulcra 87' rearward, whereby the four pound clutch engaging pressure may momentarily be reduced as low as two pounds. But almost simultaneously the vehicle responds to the increased fuel and the two pounds again becomes four pounds. By gradually continuing the downward pressure of the pedal he may continue to shift the fulcra 87' to reduce the four pound clutch engaging pressure and the increasing vehicle speed will just as rapidly restore the four pound pressure by a corresponding increase in speed. It is apparent that by properly arranging and proportioning the parts 123, 127, 128, 118 and 119, the fulcra 87' may be so shifted in relation to a change in the carbureter setting that, as the speed of rotation varies, the fulcra 87' will always be positioned so as to cause a clutch engaging pressure of four pounds to be applied to the inside of the clutching spring 73' whereby high gear connection may be retained throughout in raising the speed of the vehicle from eleven and one-half M. P. H., to its maximum speed.

On the other hand, if the the operator is in high gear and moving eleven and one-half M. P. H., and wishes to drop back to second gear to raise the vehicle speed, he has only to depress the accelerator pedal slightly faster than the speed of the engine can respond, whereupon he will shift the fulcra rearward and reduce the clutch engaging pressure from four pounds to one pound whereupon it will let go and second speed will automatically be in effect.

It will be seen that whenever the vehicle is in high gear, and moving less than its maximum second gear speed, a sudden depression of the accelerator pedal, which will offer fuel faster than the engine can take it in high gear, will result in a return of the mechanism to second gear to allow the engine to speed up and use the excess fuel offered and thereby accelerate the vehicle speed more rapidly.

There is a further distinct advantage in having the fulcra 87' shiftable. This may be best illustrated by considering another driving condition. Assume that the vehicle is on a level road and in high gear and the accelerator pedal is set to a position which will propel the vehicle at about twenty-five M. P. H. With the mechanism proportioned as hereinbefore indicated the fulcra 87' will now be so shifted that a clutch engaging force of four pounds is being applied to the interior of the clutching spring 73'.

If the vehicle now encounters a hill, and the operator does not change his accelerator pedal setting, the increased resistance will gradually pull the rotative speed of the governor mass down, while the fulcra 87' remains fixed, until the four pounds clutch engaging force is reduced to one pound, whereupon the change from high to second gear will be automatically effected.

When the mechanism is in low gear all gears on the countershaft 42 revolve in unison and the gears on the shaft 27 revolve at different speeds. But when the mechanism is in high gear the shafts 27 and 28 and each and every member carried on them revolve in unison and the countershaft gears all revolve at different speeds.

Now even in high gear, and at the highest vehicle speeds, the clutches 39 and 41 retain their overrunning characteristics, so that free wheeling may be had through them even though they are drivingly engaged. But however advantageous free wheeling may be at other times, the opposite, or so called engine braking is always more desirable whenever the regular vehicle brakes are being applied. To effect this more desirable end, the clutching spring 98 and its operating mechanism is provided. Its operation is as follows:

The clutching spring 98 being loosely fitted to the cups 96 and 97 fails ordinarily to connect them in driving relation, whether the one or the other is revolving the faster, but, being a right hand coiled spring, if sufficient pressure is applied to the ends to cause it to start to wrap around the cups 96 and 97 then the cup 97 may not overrun the cup 96. It follows that, when free wheeling is taking place, if sufficient frictional contact is made with the ends of spring 98 it will wrap around cups 96 and 97 and the vehicle momentum will be transmitted from shaft 28 through parts 57, 34, 97, 96, 67, 27 to the engine, whereby engine braking will be established.

For applying frictional pressure to the ends of the clutching spring 98 the collar 99, fork 101, rods 102 and 103 are employed. When the rod 102 is drawn rearward the beveled ends of the spring are compressed between the beveled faces of the collar 99 and gear 34 and drawn inward until the wrap of the spring is sufficient to drive the engine against its own friction and other internal resistance.

Fig. 9 shows how the rod 102 is connected by the smaller rod 103 to the arm 104 on the brake shaft 106. With this connection each time that pressure is applied to the brake pedal to apply the regular brakes, the change from free wheeling to engine braking is effected.

Now while any ordinary friction clutch may be used to connect the cups 96 and 97, to change from free wheeling to engine braking, there is a decided advantage in using the coil clutching spring 98 for this purpose. This is best illustrated by assuming certain driving conditions.

Let it be assumed first that high gear is in effect at a speed of 20 M. P. H., and that the fuel is interrupted and as the engine is decelerating free wheeling takes place. If, now, the wheel brakes are applied, any kind of clutch which will connect the cups 96 and 97 together while they are rotating at different speeds will satisfactorily pick up the engine whereby part of the force of the vehicle's momentum will be spent in bringing the engine up to speed and maintaining its speed against its internal resistance.

But, as a different driving condition, let it be assumed that low gear is in effect. The cup 96 is now revolving three times as fast as the cup 97. Assume now there is a sudden need of applying the brakes. If an ordinary friction clutch has been embodied in the mechanism instead of the clutching spring 98, the engine and vehicle momentum would be added instead of opposed, and instead of assisting in retarding the vehicle the engine would assist in keeping it in motion.

But the latter condition is not met when the coil clutching spring 98 is employed, because this spring only picks up the engine when it is revolving slower than the shaft 28 and does not connect the cups when the cup 96 is revolving faster than the cup 97.

In my Patent No. 1,917,501 of July 11, 1933 and in my co-pending application Serial No. 661,324, filed March 17, 1933, now Patent No. 1,950,163, March 6, 1934, mechanisms somewhat similar to the present are disclosed. By a complete rearrangement of the parts, however, the herein described mechanism is made shorter. Also by having both clutches 39 and 41 always rotating at engine speed they are alike in size, while in the former mechanisms the slower operating clutch was necessarily larger than the faster.

In the present invention, although the countershaft spring clutches overrun, neither the clutch 39 nor the clutch 41 overruns when high gear is effective, whereby the governing mechanism is not subject to wear, while in the former mechanisms the low and second speed clutches are always overrunning when high gear is in effect.

Furthermore, in the former mechanisms, a small end thrust load is created by the governor mechanisms which must be taken by the ball bearings, while in the present mechanism no endthrust load whatever is created by the governors.

The present invention eliminates the standard gear shift lever but in turn has a greater number of coil spring clutches than the former mechanisms.

While in the foregoing description certain definite clutch engaging speeds and pressures were assumed to facilitate description, it will be understood that these clutch engaging speeds and pressures may be varied to provide a proper balance between the power of the vehicle engine and the vehicle weight which is to be moved.

Having described my invention,

I claim:—

1. The combination, in power transmission mechanism, of a rotatable driving member, a rotatable driven member, gearing drivably connecting the two said members, a clutch for connecting the two said members directly, overrunning means in said gear train operative when said members are connected directly, and a centrifugal means operable outwardly to engage said clutch comprising axially parallel governor weights bodily rotatable about the axis of said members pivotally held against centrifugal force near the middle, the one end being lighter than the other, and supplementary weights operative to add their centrifugal force to the said lighter ends but rotatable at a different speed than the governor weights, and means connecting the governor weights to one rotatable member for rotation therewith and the supplementary weights of the other rotatable member for rotation therewith, whereby more force is added to said lighter end as the supplementary weights are revolved faster as compared to the governor weights.

2. In power transmission mechanism, the combination of a rotatable driving member, a rotatable driven member, gearing operable by said driving member to rotate said driven member at a different speed from said driving member, a clutch for connecting said driving and driven members directly, overrunning means in said gear train operative when said members are connected directly, and a centrifugal means operable to engage said clutch comprising one set of centrifugally operable weights bodily rotated by the driving member about its axis, a second set of centrifugally operated weights bodily rotated by the driven member about its axis, and axially parallel lever arms having fulcra transversely of the said axis, connecting said two sets of weights whereby outward movement of the driving member weights causes inward movement of the driven member weights, said weights being so proportioned that the driven member weights cannot move outwardly and engage the said clutch until the driving member weights are reduced in speed to that of the driven member weights.

3. The combination, in power transmission mechanism, of a rotatable driving member, a rotatable driven member, reduction gearing drivably connecting the two said members, a clutch for connecting the two said members directly, overrunning means in said gear train operative when said members are connected directly, and a centrifugal means operable outwardly to engage said clutch comprising axially parallel governor weights bodily rotatable by the driving member about its axis, pivotally held against centrifugal force near the middle, the one end being lighter than the other, and supplementary weights bodily rotatable by the driven member about its axis at a different speed than said governor weights but operative to apply their centrifugal force to the lighter ends of the governor weights, said weights being so proportioned that when the governor weights rotate faster than the supplementary weights the supplementary weights are held against radially outward movement thereby preventing engagement of the clutch, but when the governor weights and the supplementary weights revolve at the same speed the supplementary weights move outwardly and engage the clutch.

4. The combination, in power transmission mechanism, of a driving clutch member, a driven clutch member, reduction gearing connecting the driving to the driven clutch member, means for connecting the two clutch members directly, overrunning means in said gearing operative when said clutch members are connected directly, and a centrifugal governor for operating said connecting means comprising axially parallel arms bodily rotatable about the clutch axis, light and heavy centrifugal weights secured to opposite ends of said arms, and supplementary centrifugal weights associated with said light centrifugal weights, operative to add their centrifugal force to that of the light weights, said arms being rotatable in unison with the one said clutch member and said supplementary weights in unison with the other, fulcrum pins near the middle of said arms, and manual means to shift said fulcrum pins axially in relation to said weights.

5. The combination, in power transmission mechanism, of a driving clutch member, a driven clutch member, reduction gearing connecting the driving to the driven clutch member, means for connecting the two clutch members directly, overrunning means in said gearing operative when said clutch members are connected directly, a centrifugal weight rotatable by said driven clutch member operative to move from the axis and engage said clutch, a second centrifugal weight rotatable by the driving clutch member at the same or at different speeds from the first said weight, a lever arm having one end attached to the said second weight and the other end holding the first said weight from outward movement, a fulcrum member near the middle of said arm, means to control the speed of the driving member and means associated with the said control means for simultaneously shifting the said fulcrum member lengthwise of the said lever.

6. The combination, in power transmission mechanism, of a driving clutch member, a driven clutch member, reduction gearing connecting the driving to the driven clutch member, means for connecting the two clutch members directly, overrunning means in said gearing operative when said clutch members are connected directly, a centrifugal weight rotatable by said driven clutch member operative to move from the axis and engage said clutch, a second centrifugal weight rotatable by the driving clutch member, a lever arm secured at one end to the second said weight, the other end opposing radial movement of the first said weight but not effecting its rotation about the clutch axis, a fulcrum member near the middle of said arm whereby radial movement of one weight outwardly moves the other weight inwardly, means for controlling the speed of rotation of the driving clutch member and means operable by said speed control to shift said fulcrum member in such relation to the speed that the outward force of the first said weight to keep the clutch engaged slightly exceeds the opposing force of the second said weight to keep it disengaged when both weights are revolving in synchronism.

7. The combination, in power transmission mechanism, of an engine, a driving clutch member, connected for rotation in unison with said engine, a driven clutch member, reduction gearing connecting the two said clutch members, means for connecting the two clutch members directly, overrunning means in said gearing operative when said clutch members are connected directly, a centrifugal weight rotatable by the driven member operative to move outwardly and engage said clutch, a second centrifugal weight rotatable by the driving clutch member, a lever arm fulcrumed near its middle so connecting the two weights that outward movement of the one said weight moves the other inward, but which does not prevent the two weights rotating at different speeds, an accelerator pedal for varying the speed of said engine, and mechanical linkage extending from said accelerator pedal to the fulcrum of said lever arm proportioned to so shift said fulcrum in relation to the position of the accelerator pedal that the force of the second said weight to keep the clutch disengaged will be slightly less than enough to overcome the force of the first said weight to keep it engaged when the two weights are revolving in synchronism.

8. The combination, in power transmission mechanism, of an engine, a driving clutch member connected for rotation in unison with said engine, a driven clutch member, gearing connecting the two clutch members for rotating the driven member at a lower speed than the driving member, means for connecting the two said clutch members directly, overrunning means in said gearing operative when said clutch members are connected directly, a centrifugal weight rotatable by the driven clutch member operative to move outwardly to engage the clutch, a second centrifugal weight rotatable by the driving clutch member, a lever arm having an axially shiftable fulcrum near its middle and its ends so connected to said weights that outward movement of the driving clutch member weights draws the driven clutch member inward to disengage the clutch but does not prevent the two weights revolving at different speeds, an accelerator pedal for varying the fuel being fed to said engine, and linkage connecting said pedal and said axially shiftable fulcrum for shifting said fulcrum according to the engine fuel setting, the proportion of the weights, the positions of the fulcrum, and the fuel setting being such that the second said weight will overrun the first to keep the clutch disengaged as long as gear driving is effective, the first said weight will overcome the second and engage the clutch when the two weights become synchronized, and the second said weight will overcome the first and disengage the clutch when the fuel setting is advanced and the fulcrum shifted faster than the engine can respond to raise the speed.

9. In an automotive transmission mechanism, a drive shaft, an axially aligned driven shaft, a parallel spaced apart countershaft, a low, a second and a high speed gear spaced apart on the drive shaft, a low, a second and a high speed mating gear on the countershaft in constant mesh with said drive shaft gears, normally ineffective overrunning clutches on the drive shaft between the spaced apart gears for overrunningly connecting adjacent gears together, overrunning clutches connecting spaced apart countershaft gears, speed responsive means for making said normally ineffective overrunning clutches effective, and means for connecting or disconnecting the low speed gear to or from the driven shaft.

10. In an automotive transmission mechanism, a housing, a drive shaft extending the full length of said housing, a short axially aligned driven shaft surrounding the drive shaft at the rear end thereof, a sliding gear splinedly mounted and axially shiftable on said driven shaft, a low, a second and a high speed gear spaced apart on the remaining portion of the drive shaft, said low speed gear having clutch teeth adapted to be engaged by said sliding gear, clutches between the said spaced apart gears, a countershaft, a low, a second and a high speed mating gear on the countershaft in constant mesh with the drive shaft gears, a reversing gear on said countershaft near the rear end thereof, an idler gear in constant mesh with said reversing gear, overrunning means between the low and the second and between the second and the high speed mating gears, speed responsive means for engaging said clutches, and means to shift said sliding gear forward into mesh with the said clutch teeth or rearward into mesh with said idler gear.

FREDERICK W. COTTERMAN.